Patented Dec. 21, 1948

2,457,054

UNITED STATES PATENT OFFICE 2,457,054

LUMINESCENT MATERIALS FOR ELECTRIC DISCHARGE DEVICES

Humboldt W. Leverenz, South Orange, N. J., assignor to Radio Corporation of America, a corporation of Delaware No Drawing. Application December 31, 1941, Serial No. 425,023

6 Claims. (Cl. 252—301.4)

My invention relates to luminescent materials or phosphors and particularly to inorganic phosphors comprising multi-metal silicates and germanates, their method of manufacture, and to the combination of such phosphors in electric discharge devices.

Many luminescent materials or phosphors, particularly those of the oxygen-containing type such as silicates or germanates of zinc, zinc-beryllium, or zinc-zirconium, as well as silicates or germanates of cadmium and magnesium, when subjected to exciting energy, produce fluorescence with little phosphorescence following cessation of excitation. In addition, under some conditions such phosphors are somewhat unstable under the reducing action of corpuscular energy such as electronic or ionic bombardment encountered in cathode ray tubes or in luminescent lamps. It is desirable to provide luminescent materials or phosphors having high stability to such bombardment as well as properties of intense phosphorescence over relatively long periods of time in many applications, and in particular in luminescent lamps to avoid stroboscopic effects and in cathode ray tubes utilized in aircraft position and distance indicating equipment so that the reception of signals may be observed over relatively long periods of time and the trajectory of an approaching aircraft may be rendered visible. While it has been proposed to incorporate a small percentage of lead in a silicate as a fluorescence activator, this use of lead does not materially increase the phosphorescence. Furthermore, small amounts of arsenic in activator proportions of from .001 to .05 percent in an oxygen-containing phosphor such as a silicate enhance the phosphorescence very slightly, such use of arsenic increases the phosphorescence only nominally and even greater phosphorescence following excitation is necessary for many applications to which materials made in accordance with my invention may be applied.

It is an object of my invention to provide a luminescent material or phosphor containing silicon or germanium and having high fluorescent and phosphorescent efficiency. It is another object to provide a material having intense phosphorescence following excitation by radiant or corpuscular energy. It is a further object to provide a highly luminous phosphor which is stable under long continued use in electric discharge devices and one having high intensity phosphorescence following excitation to luminescence. It is a still further object to provide phosphors and methods of manufacturing phosphors comprising inorganic silicates and germanates having higher phosphorescent efficiencies than usually attainable in such phosphors.

In accordance with my present invention I utilize tin or lead in combined form incorporated in an oxygen-containing phosphor such as a silicate or germanate not as an element wholly replacing silicon or germanium or as an activator but as a principal constituent of the silicate or germanate phosphor. Thus the tin or lead is not used in a proportion comparable to activator proportions such as from .0001 to .01 molal but is used as a major constituent of the crystallized silicate or germanate phosphor. This major constituent in accordance with my invention is tin or lead compounded with other elements wherein the amount of tin or lead is much greater than conventionally used activator proportions and may be from .1 to 70 percent based on the total weight of the silicate or germanate phosphor. The luminescent material or phosphor resulting from my invention is a crystalline structure comprising one or more metal silicates or germanates incorporating tin in combination with the silicate or germanate radical in addition to the one or more metals referred to above which may include zinc, cadmium, beryllium, zirconium, magnesium or other metals hereinafter specifically referred to.

I will refer specifically to tin in the following description of my invention, but where I mention the use of tin or its compounds it should be understood that lead may be substituted either in whole or in part for the tin. It should also be clearly understood that my material is not a mechanical mixture of a silicate or germanate with a compound of tin but actually is a homogeneous crystallized composition comprising one or more of the metals and tin as a silicate or germanate in a single crystal lattice structure and may be referred to as silico- or germano-stannates or stanno-silicates or germanates. I have found that while the properties of silicon, germanium and tin are such as to cause them to be classified in the second sub-group of the fourth group of the periodic system, tin or lead does not specifically intersubstitute as do the silicon and germanium in my silicate or germanate phosphor. This is largely due to the greatly different ionic radii which are: $Si^{++++}$ 0.39Å., $Ge^{++++}$ 0.44Å., $Sn^{++++}$ 0.74Å., and $Pb^{++++}$ 0.84Å. Thus a silicate or germanate containing tin or lead in relatively large quantities has luminescent characteristics which are dissimilar from a conventional zinc, zinc-beryllium or zinc-zirconium silicate or germanate. It appears that the presence of considerable tin in the phosphor increases the number of electron trapping positions so that the transition from a luminescence-producing excited condition to a stable nonluminous condition is delayed, thereby increasing the period of phosphorescence following excitation. This is distinctly contrary to the effect usually produced by a silicate phosphor activator which increases the ability of the phosphor to luminesce but does not materially vary the intensity or persistence of the phosphorescence of the phosphor.

Further in accordance with my invention, I provide a method of manufacturing activated luminescent silicates and germanates including a step of crystallizing the phosphor materials in the presence of ammonia gas or of ammonia gas and water vapor rather than by other known methods such as crystallization in a reducing or oxidizing atmosphere. Such crystallization produces a large crystal phosphor which has excellent fluorescent and phosphorescent efficiencies as well as larger crystal size. Tin-containing silicate and germanate phosphors prepared in a reducing or oxidizing atmosphere have more intense and longer periods of phosphorescence but when my tin-containing materials are crystallized in the presence of ammonia and water vapor, the increase is much greater. Thus the phosphorescent efficiencies have been increased by a ratio of as great as five to one and the yield of usable phosphor following crystallization is from two to four times the yield obtainable by other known methods.

As an example of my invention, I mix pure silicon dioxide with an aqueous solution of zinc nitrate and also another metal nitrate, if such other metal is desired, such as an aqueous solution of beryllium nitrate or zirconium nitrate or both, with a tin compound such as stannic oxide. To the aqueous suspension of these materials I add a precipitant such as ammonium carbonate and evaporate with stirring to dryness. To this dried precipitate I add a suitable activator solution such as an aqueous solution of manganese nitrate, although the manganese may be added prior to the addition of the precipitant. Exceptionally pure materials should be used in the synthesis of luminescent materials, such pure materials usually being referred to as "luminescence pure." Thus the quantities of iron, copper and other contaminating metals should be maintained at a minimum. The water used to prepare the aqueous solutions should be distilled at least three or four times, the final distillation being from a quartz still to insure maximum purity. Following the above, I dry, grind, and/or mix and crystallize the material by firing at a temperature and for a sufficient length of time to obtain complete crystallization. As a specific quantitative example, I mix 3.7063 grams of finely divided luminescence-pure silicon dioxide with 16.59 milliliters (ml.) of 3.68 molal zinc nitrate in water solution, 16.96 ml. of 1.80 molal aqueous solution of beryllium nitrate and 2.303 grams of stannic oxide. The sizes of the ultimate phosphor particles may be controlled by varying the particle sizes of the ingredients. Smaller ingredient particles yield smaller phosphor particles. The silicon dioxide may be colloidal and may be derived as a gel from a pure alkyl silicate, alkali silicate or silicon tetrachloride and the stannic oxide may likewise be colloidal, being derived from organic stannates, chlorides or other tin compounds. The suspension of oxides in the nitrates is warmed and to this I add 41 ml. of approximately 5.4 normal ammonium carbonate aqueous solution. The material is stirred and evaporated at from 200 to 300° C. to decompose substantially all of the carbonates and to dry the materials which are then ground with a quartz rod to thoroughly mix the material constituents. With this material as a product and to 3.3478 grams of the product I add 0.92 ml. of 0.20 molal manganese nitrate solution, together with about 2 ml. of pure distilled water and about 1 ml. of 5.4 normal ammonium carbonate. This second product is stirred and evaporated to dryness at about 200 to 300° C. and is ground, mixed and fired in air in a covered platinum or quartz crucible. I heat the crucible and its contents to a glowing temperature of from 600 to 1600° C. for a period of from one minute to ten hours, the time being shorter for the higher temperatures. The heating of the crucible contents produces a chemical combination such that the individual crystals of the product, as well known in the art, acquire a single lattice structure. This positively distinguishes my material from intimate mechanical admixtures wherein various ingredients are added following the crystallization of the luminescent material. Preferably the cold crucible containing the material to be crystallized is placed in a cold electric muffle furnace and the temperature of both crucible and furnace raised together. Alternatively the crucible may be heated slowly and may then be placed in the hot furnace. The phosphor material thus formed during the heating process may be cooled slowly or quenched to afford a means of varying the intensity and duration of the phosphorescence. Thus for the above composition I have found increased phosphorescence to result when the composition is crystallized at a temperature of from 1000 to 1200° C. for about sixty minutes and then cooled rapidly or quenched. The product is a white or slightly pink cake which is easily broken up. The phosphor may be comminuted or may be used as it is when the cake disintegrates easily.

In accordance with my invention I have found that when crystallizing phosphor materials in the presence of ammonia or in the presence of water vapor and ammonia, the increase in fluorescent efficiency may be as much as two or three to one and an increase of phosphorescence of as much as five to one over materials not so crystallized. More particularly, the crucible containing the materials being crystallized may be fed with live steam in considerable quantity, the live steam containing entrapped ammonia. The ammonia-treated steam may be obtained by boiling a solution of ammonium hydroxide or from any other ammonium compound or directly from ammonia gas. The initial ingredients may be mixtures of materials which are soluble and insoluble compounds comprising the final phosphor, and various fluxes such as chlorides or fluorides may be used to facilitate crystallization, the fluxes being removed later by washing the final product with water.

It will be noted from the above example that one of the constituents of my phosphor is silicon dioxide, but germanium dioxide may be substituted for the silica in whole or in part, it being noted that both silicon and germanium are classified in the second sub-group of the fourth vertical group of the periodic system, their ionic radii being $Si^{++++}$ 0.39Å. and $Ge^{++++}$ 0.44Å. respectively, these radii being between 0.3 and 0.5 angstrom. Furthermore, I have disclosed the use of two preferred metals, namely, zinc and beryllium as forming the remaining metallic content of the unactivated phosphor other than tin. It may be pointed out that beryllium may be omitted or substituted in whole or only in part as indicated above for the zinc and that in addition to beryllium, cadmium, magnesium, calcium, strontium and barium as well as zirconium, titanium, thorium, hafnium, aluminum, gallium, potassium, sodium and lithium may be used either in whole or in part for the zinc or beryllium. It will be noted that beryllium, cadmium, magnesium, calcium, strontium and barium are metals of the second vertical group of the periodic system whose oxides do not decompose below 700° C., and any single one of these metals or combinations thereof may be substituted in whole or in part for the zinc.

The quantity concentration of tin may vary from about .1 to 70 percent by weight of the phosphor. The higher concentrations of tin usually obtain when metals of low atomic weight comprise the metallic elements other than tin in the phosphor, such as sodium, beryllium, magnesium, calcium, titanium, lithium, boron and aluminum, whereas the tin concentration is usual'y lower when the heavier metallic elements such as zinc, zirconium, cadmium, strontium, tungsten and barium are the chief metallic constituents other than tin in the phosphor. Furthermore, in the example recited above I indicated that the silicate or germanate phosphor might be activated with manganese, whereas other multi-valent activator metals may be substituted in whole or in part for the manganese. Furthermore, the activator may be omitted and the pure phosphor's phosphorescence used. Furthermore, I may crystallize my phosphor material in a furnace containing a reducing, neutral, or oxidizing atmosphere in addition to or without the atmosphere comprising ammonia or ammonia and water vapor to control the ultimate valency of the tin in the phosphor and thereby control the action of the tin in enhancing phosphorescence. Thus silicate phosphors made in a slightly oxidizing atmosphere containing, in addition, ammonia and water vapor seem to have the property of giving maximum phosphorescence.

The amount of silica or germania may be varied from amounts less than that needed for ortho silicate or germanate proportions to 100 percent, or more than required for true ortho-proportions. In practice I have found that the amount of silica and likewise of germania may be varied from a lower limit of approximately 20 percent to an upper limit of approximately 500 percent of the amount which would be necessary calculated on the basis of ortho-proportions. I have found that phosphors prepared with and containing an excess of silica or germania, with respect to ortho-proportions, give longer phosphorescence than those containing true ortho-proportions or less. The molal ratio of the metallic elements other than tin in the phosphor to silicon or germanium may vary from 3:1 to 1:6, and likewise the molal ratio of the said metallic elements other than the tin in the phosphor to tin may vary from 1:20 to 50:1. These ratios correspond to a molal ratio of silicon or germanium to tin of from 2500:1 to 1:60. Likewise, in preparing an activated phosphor the amount of activator such as manganese or the other activators referred to above may be varied within wide limits, for example, between values of 0.1 molal to 0.00001 molal with respect to the total cation molality. Maximum efficiency, however, in the conversion of incident energy to light is usually obtained with manganese as an activator at approximately 0.006 molal.

It should be distinctly understood that wide variations in the amounts of zinc, beryllium, silicon or germanium dioxide, manganese activator or other constituent metal, or in the temperature of crystallization, produce no unpredictable change in the properties of my phosphor. An increase in the beryllium or other metal constituent such as zirconium, titanium, cadium or thorium broadens the spectral response band of the resulting phosphor and shifts the median spectral response toward the red portion of the spectrum. Such increase of these metals likewise tends to decrease the phosphorescence. An increase in the manganese content tends to decrease phosphorescence and produces a color shift toward the red. An increase in the silica or germania, or silica and germania content increases phosphorescence and shifts the spectral median toward the longer wavelengths. Furthermore, an increase in the silica or germania or combination of silica and germania content increases the ability of the phosphor to hold more manganese with a consequent increase in phosphorescence, notwithstanding the tendency of manganese to decrease the phosphorescence, and such increase in phosphorescence is obtained with the desired shift of the color response toward the red end of the spectrum attendant upon increase of the manganese activator. Thus a gradual transition in the properties of the produced phosphor may be obtained by varying the constituents. While specific compositions may offer certain advantages such as for color matching or for mechanically mixing with other phosphors to obtain specific desired colors, such compositions are not of themselves different from neighboring compositions and may be obtained without departing from the scope of my invention.

In particular, the following manganese-activated phosphors containing tin, as outlined in the foregoing description of my invention, are especially suitable for use as screens or phosphor coatings in combination with gaseous or vapor discharge devices, such as low pressure mercury vapor lamps, to yield luminescent colors which will produce in conjunction with the visible emission from the lamp a resultant color different than the phosphor screen alone or the lamp alone. The predominant wavelength emission of these phosphors is longer than 3650 Å. when excited by mercury discharges wherein the predominant wavelength is shorter than 3650 Å.

|  | Color in lamp |
|---|---|
| Zinc silicate:Mn | Pale blues—pale greens |
| Zinc beryllium silicate:Mn | White or cream colors |
| Zinc beryllium zirconium silicate:Mn | White or cream colors |
| Cadium silicate:Mn | Lavender colors |
| Zinc germanate:Mn | Pale blues—pale greens |
| Zinc beryllium germanate:Mn | Whites or creams |
| Zinc beryllium zirconium germanate:Mn | Whites or creams |
| Cadium germanate:Mn | Lavenders |
| Magnesium silicate:Mn | Purples |
| Magnesium germanate:Mn | Purples |

I have found that a discharge device such as a mercury lamp alone gives a relatively saturated blue emission, while the phosphors containing tin made in accordance with my invention give relatively saturated colors. However, the combination of the lamp with the phosphor screen or coating produces a desirable paler, less saturated color than either the lamp or the phosphor alone, and in some cases produces particularly good white light approximating either daylight or warm white light.

Furthermore, luminescent materials made in accordance with my invention are suitable for use as luminescent screens in cathode ray tubes wherein the excitation is corpuscular rather than undulatory and corpuscular, such as radiant and ionic, as in a mercury lamp. For such applications and where high secondary emissivity of the phosphor is desired, the phosphor materials, either before or after crystallization, may be mixed with small amounts of barium, strontium, lanthanum, calcium, magnesium, caesium, rubidium compounds or other compounds in which the metallic elements have large ionic or atomic radii.

I have particularly described my invention with reference to the new use of tin as an active ingredient in an oxygen containing phosphor, but I have obtained satisfactory results when using lead substituted either in whole or in part for the tin, the process of manufacture including the ammonia crystallization being the same as given above. Although the effective phosphorescence of the lead containing phosphor is not quite of as long duration as phosphors containing tin, the phosphorescence, however, is of greater duration than previously known phosphors containing neither tin nor lead as active ingredients. Thus where I have referred to tin and its compounds and the specific ratios with respect to tin, lead may be substituted either in whole or in part for the tin without undue sacrifice in the phosphorescent properties of the resulting phosphor except when very small concentrations of lead are used such as from .0001 to .01 molal, in which cases the lead acts principally as an activator.

Although I do not wish to be limited to any particular theory in explaining the increased phosphorescence and slow decay of phosphorescence following excitation of my tin-containing phosphors, it appears that the phosphorescence is the result of freeing electrons trapped in or near activator centers and in crystal faults of the phosphor which, in returning to activator centers in the phosphor crystal lattice, liberate their energy in the form of light. It appears that the tin constituent in my phosphors greatly increases the number of trapping positions in the phosphor, probably by inducing a faulty crystal structure or surface discontinuity. This provides a greatly increased number of positions at which electrons may be delayed in returning to the activator centers, thus considerably increasing the period of time during which effective phosphorescence is produced.

While I have indicated the preferred embodiments of my invention of which I am now aware and have also indicated only a few specific applications for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

I claim:

1. A crystalline luminescent multi-metal oxygen compound consisting of an oxide of a first member selected from the group consisting of silicon, and germanium and mixtures thereof, an oxide of a second member selected from the group consisting of beryllium, magnesium, zinc, and cadmium, and mixtures thereof, and an oxide of a third member selected from the group consisting of tin, and lead and mixtures thereof, said oxides being co-crystallized, and a manganese activator in said co-crystallized oxides in activator proportions, the molal ratio of said second member to said third member being 1:20 to 50:1 and the molal ratio of said second member to said first member being from 3:1 to 1:6, said compound constituting a single crystal structure.

2. A crystalline luminescent multi-metal oxygen compound consisting of the co-crystallized oxides of zinc, tin, and a member selected from the group consisting of silicon, and germanium and mixtures thereof and a manganese activator in said co-crystallized oxides in activator proportions, the molal ratio of zinc to tin being from 1:20 to 50:1 and the molal ratio of zinc to said member being from 3:1 to 1:6, said compound constituting a single crystal structure.

3. A luminescent crystalline compound consisting of zinc stanno silicate and manganese activator in activator proportions, said compound constituting a single lattice structure.

4. A luminescent crystalline compound consisting of zinc beryllium stanno silicate and manganese activator in activator proportions, said compound constituting a single lattice structure.

5. A luminescent crystalline compound consisting of zinc beryllium stanno germanate and manganese activator in activator proportions, said compound constituting a single lattice structure.

6. The method of making silicate and germanate phosphor compounds which consists in heating together a member of the group consisting of oxides of silicon, and germanium and mixtures thereof, a member of the group consisting of oxides of zinc, beryllium, calcium, cadmium, magnesium, strontium, and barium, and mixtures thereof, a member of the group consisting of the oxides of tin and lead and mixtures thereof, the said ingredients being in the proportions necessary to form the desired phosphor compounds and a manganese activator in activator proportions, said heating being at a temperature between 600° C. and 1600° C. in a current of live steam containing entrapped ammonia.

HUMBOLDT W. LEVERENZ.

REFERENCES CITED

The following references are of record in the file of this patent:

UNITED STATES PATENTS

| Number | Name | Date |
|---|---|---|
| 1,804,176 | McQuaid | May 5, 1931 |
| 2,066,044 | Leverenz | Dec. 29, 1936 |
| 2,171,145 | Leverenz | Aug. 29, 1939 |
| 2,241,950 | Huniger | May 13, 1941 |
| 2,258,472 | Ruttenauer | Oct. 7, 1941 |
| 2,260,924 | Swindells | Oct. 28, 1941 |
| 2,270,124 | Huniger | Jan. 13, 1942 |
| 2,274,163 | Puleston | Feb. 24, 1942 |
| 2,274,272 | Leverenz | Feb. 24, 1942 |
| 2,306,270 | Leverenz | Dec. 22, 1942 |
| 2,306,271 | Leverenz | Dec. 22, 1942 |

FOREIGN PATENTS

| Number | Country | Date |
|---|---|---|
| 811,156 | France | Jan. 14, 1937 |